United States Patent [19]
Baumann et al.

[11] Patent Number: 5,840,354
[45] Date of Patent: Nov. 24, 1998

[54] DRIED FRUIT PRODUCTS FORTIFIED WITH CALCIUM AND METHOD OF PREPARATION

[75] Inventors: Lanny P. Baumann, Arden Hills; Richard O. Benham, New Hope, both of Minn.; Laurie C. Burgess, Merrimac, N.H.; Daniel L. Gordon, Plymouth, Minn.

[73] Assignee: General Mills, Inc., Minneapolis, Minn.

[21] Appl. No.: 867,785

[22] Filed: Jun. 3, 1997

[51] Int. Cl.$^6$ .............................. A23L 1/06; A23L 1/304
[52] U.S. Cl. ........................... 426/74; 426/106; 426/132; 426/420; 426/514; 426/523; 426/599; 426/615; 426/616; 426/639; 426/658
[58] Field of Search ............................ 426/74, 615, 616, 426/639, 658, 514, 523, 599, 106, 132, 420

[56] References Cited

U.S. PATENT DOCUMENTS

| | | |
|---|---|---|
| 2,272,990 | 2/1942 | Forkner et al. . |
| 2,650,880 | 9/1953 | Erickson . |
| 2,855,315 | 10/1958 | Perrozzi et al. . |
| 4,515,822 | 5/1985 | Kraig et al. . |
| 4,542,033 | 9/1985 | Agarwala . |
| 4,722,847 | 2/1988 | Heckert . |
| 4,737,375 | 4/1988 | Nakel et al. . |
| 4,784,871 | 11/1988 | Park . |
| 4,786,510 | 11/1988 | Nakel et al. . |
| 4,830,862 | 5/1989 | Braun et al. . |
| 4,961,943 | 10/1990 | Blanthorn et al. . |
| 4,992,282 | 2/1991 | Mehansho et al. . |
| 5,084,296 | 1/1992 | Lugay et al. ............................ 426/639 |
| 5,186,965 | 2/1993 | Fox et al. . |
| 5,364,643 | 11/1994 | Morimoto et al. . |
| 5,445,837 | 8/1995 | Burkes et al. ............................ 426/74 |
| 5,455,053 | 10/1995 | Zimmerman et al. .................. 426/106 |

FOREIGN PATENT DOCUMENTS 1 564 452   4/1980   United Kingdom .

*Primary Examiner*—Helen Pratt
*Attorney, Agent, or Firm*—John A. O'Toole; L. MeRoy Lillehaugen; Everett G. Diederiks, Jr.

[57] ABSTRACT

Disclosed are improved, intermediate moisture sweetened fruit compositions fortified with calcium supplied by calcium phosphate. The fruit compositions comprise: A) about 5 to 65% by weight of fruit solids; B) about 0.1 to 85% of carbohydrates; C) about 180 to 1500 mg/oz total calcium; and D) about 9 to 20% moisture. Also disclosed are methods for the preparation of such fruit products involving forming a concentrated slurry of calcium phosphate having a particle size such that at least 90% are less than 150 $\mu$m, forming a wet blend of fruit ingredients, drying the wet blend to 9 to 20% moisture and admixing the dried fruit composition while warm with the slurry to form a dried sweetened calcium composition and forming into desired shaped and sized pieces.

32 Claims, No Drawings

DRIED FRUIT PRODUCTS FORTIFIED WITH CALCIUM AND METHOD OF PREPARATION

FIELD OF THE INVENTION

The present invention relates to food products. More particularly, the present invention relates to sweetened dehydrated fruit products fortified with calcium and to their methods of preparation.

BACKGROUND OF THE INVENTION

Recent medical studies have indicated that a diet containing the U.S. recommended daily allowance (RDA) of calcium may be effective in preventing or mitigating osteoporosis, and also possibly high blood pressure and colon cancer. There is therefore great public interest in the consumption of food products that will supply the recommended daily allowance of calcium.

Wholesome snacks prepared from sweetened, intermediate moisture, shelf stable fruit or "fruit snacks" herein have recently become popular food items. These compositions per se are sold in various physical forms and shapes such as rolls, sheets, or in bite size pieces. (See, for example, U.S. Pat. No. 2,272,990, issued Oct. 18, 1941 to Forkner et al. and U.S. Pat. No. 2,650,880, issued Oct. 1, 1941 to A. M. Ericson). Generally, these products are prepared from wet mixtures of the various fruit materials and added ingredients that are dried to desired moisture contents. The dehydrated compositions are then formed into articles of desired shapes and sizes.

Particularly popular products are in rolled sheet form such as are sold under the Fruit Roll-Ups brand, in rolled strip form sold under the Fruit By The Foot brand (see also, U.S. Pat. No. 5,455,053 entitled "Rolled Food Item," issued Oct. 3, 1995) or in bite size pieces of various shapes.

These products are especially popular with children, particularly as snack or convenience foods. Growing children, of course, have a particular need for calcium in their diet. Unfortunately, fruit snacks are not a good source of calcium. The typical calcium content of a fruit is only on the order of under 50 mg/oz (dry basis).

Thus, while fruit snacks are popular, it would be desirable if such fruit snacks were fortified with supplemental calcium to provide a significantly nutritionally enhanced product. By significantly nutritionally enhanced is meant a product having at least 20% of the current recommended daily allowance ("RDA") or at least 180 mg of calcium (including both the native and supplemental contributions) per 1 oz (wet basis) of fruit snack serving.

The gelling properties of a variety of gelling agents, including pectin, can be enhanced by adding an ingredient that supplies a soluble calcium ion. Since fruit contains pectin, prior art thus includes numerous teachings regarding the use of soluble calcium to adjust the texture properties of fruit materials. Jam and jelly making are two familiar examples. However, since the impact of soluble calcium or gel strength is typically strong even at low concentrations, the supplemental level is generally less than 500 ppm. Also, such fruit products typically have higher moisture contents than the present fruit snacks. Thus, typical calcium level manipulation teachings regarding texture control do not provide compositions having the levels of calcium desired for nutritional fortification.

Previous art attempts at providing fruit products that have enhanced calcium levels include U.S. Pat. No. 4,542,033 entitled "Sugar and Acid Infused Fruit Products and Processes Therefor" issued Sep. 17, 1985 to Agarwala which teaches the infusion of sugars, acids and soluble calcium salts into discrete fruit pieces with subsequent dehydration.

Similarly, the art includes numerous teachings directed towards forming a highly soluble complex of citric acid, malic acid and calcium. (See, for example, U.S. Pat. No. 5,186,965 entitled "Calcium Citrate Malate Composition"). While useful, such formulations require addition of expensive special ingredients or extensive processing to form the materials in situ. Also, such teachings are directed toward fluid products albeit concentrates in some instances.

In view of the prior art, there is a continuing need for new and useful intermediate moisture sweetened fruit compositions that provide enhanced nutrition and particularly enhanced calcium levels. Accordingly, it is an object of the present invention to provide sweetened dried fruit products having improved organoleptic properties.

In particular, it is an object of the present invention to provide methods for preparing calcium fortified sweetened dried fruit compositions.

Soluble calcium salts typically are expensive and contain low weight percentages of calcium. While calcium chloride is an exception to this generalization, addition of significant calcium levels supplied by calcium chloride impart an unacceptable salty and bitter flavor to dried sweetened fruit products.

Insoluble calcium salts, particularly calcium phosphate salts provide high levels of calcium and are relatively inexpensive. Moreover, such calcium phosphate salts can be used to provide calcium at high fortification levels with an acceptable taste. However, one problem in providing dried sweetened fruit products fortified with calcium supplied by calcium phosphate salts resides in the difficulties of manufacture on a commercial scale.

In the typical process for making a sweetened dry fruit product, a wet preblend of all ingredients is made before drying. Post drying addition of ingredients, particularly in solid form, is typically not practiced since it is difficult to obtain an homogeneous admixture after drying due to the highly viscous nature of the dried fruit material even at elevated temperatures. However, if insoluble calcium phosphate salts are added to the wet blend, being insoluble causes the calcium salt to settle prior to drying and to effloresce during product processing, particularly during the dehydration step. The efflorescence problem manifests itself by forming an unsightly topical white film. Not only is the white film unsightly, but also the insoluble powder tends to coat the food processing equipment. The white powder is not only difficult to clean but also leads to undesirable increased equipment wear.

In view of these processing difficulties, a further important object of the present invention is to provide for commercially practical methods for preparing calcium fortified sweetened dried fruit products.

Still another object of the present invention is to provide methods for prepared calcium fortified sweetened dried fruit products wherein the calcium is supplied by insoluble calcium salts such as calcium phosphates.

It has been surprisingly discovered that the above objectives can be realized and superior dried sweetened fruit provided by formulating compositions, comprising fruit solids, nutritive carbohydrate sweeteners, calcium phosphate(s) of particular particle size and moisture and methods of preparation involving the post dehydration incorporation of the insoluble calcium source material in slurry form.

SUMMARY OF THE INVENTION

In its product aspect, the present invention is directed towards sweetened, dried fruit products such as fruit leathers comprising fruit solids, supplemental carbohydrate and a calcium phosphate salt in a quantity sufficient to bring the total calcium content of the composition to from about 180 to 1500 mg per 28.4 g (1 oz) serving (wet basis) (0.6% to 5.5% by weight).

The calcium amounts include both the native level supplied by the fruit materials source as well as the supplemental added calcium.

The calcium is supplied by an insoluble calcium phosphate selected from the group consisting of tricalcium phosphate, dicalcium phosphate, and their hydrates, and mixtures thereof.

The calcium phosphate has a preferred particle size of less than 150 microns.

In its process aspect, the present invention resides in methods of preparing a dried sweetened fruit product fortified with calcium that is visually undetectable in the final product. The process involves the post dehydration addition of a source of insoluble calcium. The calcium phosphate has a preferred particle size of less than 150 microns.

The methods comprise the steps in sequence of: A. providing a wet fruit base comprising fruit materials that contribute fruit solids, nutritive carbohydrate sweeteners and moisture; B. dehydrating the wet fruit base to final moisture levels to form a dried sweetened fruit composition; and C. adding sufficient amounts of calcium phosphate of the requisite particle size to provide a total calcium content of about 180 to 1500 mg of calcium per 1 oz of product (0.6 to 5.5% by weight calcium) and forming the calcium fortified fruit composition into suitably sized and shaped individual pieces.

In the preferred embodiment, about 30 to 40% calcium phosphate salt is admixed with about 60 to 70% of a liquid carrier to form a slurry. The slurry is mixed with the still warm dried fruit composition. The dried fruit composition has a temperature of about 65.5° to 110° C. (150° to 230° F.) upon admixture with the slurry.

DETAILED DESCRIPTION OF THE INVENTION

The present invention provides improved, dried sweetened fruit products that are calcium fortified and that comprise fruit solids, carbohydrates and calcium phosphate and moisture and further provides methods for preparing such fruit products. Each of these components as well as product properties, preparation and use are described in detail below.

Throughout the specification and claims, percentages are by weight and temperatures in degrees Centigrade unless otherwise indicated.

Fruit Solids

A principal component of the present invention is fruit solids. The fruit solids can be derived from fruit purees prepared from whole fruit flesh or if such purees have been partially dehydrated, fruit paste. The term "puree" has been used in the art to refer to both heat treated, e.g., boiled and untreated food pulp. As used herein, however, "puree" is meant to refer both to heat and unheat-treated whole fruit pieces which have been mechanically transformed into fluids. Thus, the present comminuted fruit material can be distinguished from discrete individual pieces of intact fruit flesh.

Both unseeded and, preferably, deseeded purees can be used. Fruit puree generally contains about 55 to 90% moisture. The fruit solids component can also be supplied by other edible fruit portions, such as fruit pulp. Fruit pulp is the material remaining after fruit juices have been removed from fruit puree. Additionally useful herein for supplying the fruit solids are various fruit juices whether single strength or concentrated.

Fruit materials from any fruit can be used herein. Examples of such fruits useful herein include apricot, pineapple, lemon, orange, peach, pear, lime, banana, grape, mango, apple, tomato, blackberry, plum, watermelon, blueberry, raspberry, strawberry, current, cherry, cranberry, and mixtures thereof. Preferred fruits are selected from the group consisting of apples, strawberries, cherries, blueberries, raspberries, grapes, oranges and mixtures thereof. Most highly preferred for use herein are grapes, strawberries, oranges and cherries.

Fresh fruit is, of course, useful for preparing the products herein. However, previously frozen fruit, canned fruit, partially dehydrated fruit or rehydrated fruit, as well as frozen juices, concentrates, nectars, or frozen juice pulps are also suitable for use herein. When frozen fruit is employed, e.g., "four plus one" strawberries, i.e., frozen strawberries with one quarter part by weight added sugar, only the fruit solids contribution is to be considered.

While the present invention is primarily directed towards fruit containing products, the skilled artisan will appreciate that the present invention is equivalently applicable to all edible plant solids, especially ordinary garden variety vegetables. The sugars, flavors, acids, pectinaceous or cellulosic fibers and ash of which plant solids are typically comprised are intended to be included within the term edible plant solids. However, "edible plant solids" is not intended to include such starch fractions as wheat or other cereal flours nor oleaginous materials such a soybean oil. That is, the present fruit solids can be wholly or partially replaced with equivalent amounts of ordinary garden vegetable solids. However, vegetable flavored products are not nearly as popular as those which are fruit flavored. However, certain vegetables, e.g., pumpkin, squash and carrot enjoy some popularity as novelty items.

Also useful herein are fruit juice solids especially from inexpensive fruit sources such as grape juice, apple juice, pear juice. If present, such juice solids can constitute about 0.1 to about 70% of the finished fruit snack products herein.

The present compositions essentially comprise from about 5 to 65% (dry weight basis) of the composition of comminuted fruit or plant solids. Better results in terms of natural flavor and color but at economical costs are obtained when the fruit solids are present at from about 10 to 25%. Best results are obtained when the fruit solids are present at about 18%.

Carbohydrates

The present dried fruit compositions additionally essentially comprise an added or supplemental carbohydrate ingredient. In preferred embodiments, the carbohydrate is a nutritive carbohydrate sweetening agent (or, equivalently "sweeteners").

The carbohydrate component herein is present at from about 0.1 to 85%. Better results in terms of flavor and low stickiness are obtained when the sweeteners comprise about 20 to 70% of the composition. For best results, the supplemental carbohydrate content should range from about 30 to 45%.

The term "nutritive carbohydrate sweetening agent" is used herein to mean those typical purified sweetening agents conventionally used in food products. Of course, the present nutritive carbohydrate sweetening agents are to be distinguished from non-nutritive carbohydrate sweetening agents such as saccharine, cyclamate, and the like. Additionally, the present nutritive carbohydrate sweetening agents are to be distinguished from such protein-based sweetening agents as aspartame, thaumatin, and monellin.

Suitable materials for use as nutritive carbohydrate sweetening agents are well known in the art. Examples of sweetening agents include both mono-saccharide and di-saccharide sugars such as sucrose, invert sugar, dextrose, lactose, honey, maltose, fructose, maple syrup and corn syrup or corn syrup solids. Preferred nutritive carbohydrate sweetening agents are those selected from the group consisting of sucrose, glucose, fructose, corn syrup solids, and honey. Highly preferred nutritive carbohydrate sweetening agents are those selected from the group consisting of sucrose, corn syrup solids, and fructose. Of course, mixtures of the above-noted materials are contemplated herein.

In one highly preferred embodiment, the carbohydrate ingredient is supplied at least in part by a bodying agent. The bodying agent can serve to add both bulk and body and, most importantly, provide additional solids so as to enable the realization of fruit compositions having moisture contents within the essential ranges given herein. Especially useful herein as bodying agents are maltodextrins. Generally, the maltodextrin component is present at from about 0.1% by weight to about 50% by weight. Superior results in terms of sweetness balancing and prevention of crystallization are obtained when the maltodextrin component is present in the compositions at from about 3 to 45% by weight. For best results, however, the maltodextrin component should be employed at from about 10 to 40% of the dried fruit composition.

The bland maltodextrin provides minimal sweetness. Thus, low D.E. (dextrose equivalent) maltodextrin should be employed. By low D.E. is meant a maltodextrin with a D.E. of less than about 20. Low D.E. maltodextrins are commercially available and the skilled artisan will have no difficulty in selecting suitable maltodextrins for use herein. Generally, however, maltodextrins can be obtained by dextrinization of starch, particularly corn starch. Enzymatic hydrolyzates, optionally under acidic conditions, of the starch can be used; the conditions are so mild that negligible repolymerization occurs. This is in contrast to dextrins which typically are made from starch by hydrolyzates and repolymerization by using high temperature and pressure by dry heating or roasting of the starches (pyro dextrins). Such materials are well known (see, for example, U.S. Pat. No. 3,586,513, issued Jun. 22, 1972 to H. E. Horn et al. and U.S. Pat. No. 4,335,155, issued Jun. 15, 1982 to Blake et al.), and are widely available in the food industry.

Another class of materials useful herein as bodying or bulking agents are hydrogenated starch hydrolyzates which are commonly referred to as "polydextrose." Polydextrose provides an added advantage of being a low calorie material, i.e., having about one calorie per gram as opposed to about four calories per gram for most carbohydrates.

Calcium Salt

The present fruit snack compositions and products fabricated therefrom essentially further comprise an insoluble calcium salt of defined particle size in an amount effective to provide the desired calcium enrichment. Good results are obtained when the present fruit snack compositions and products contain about 180 to 1500 mg calcium per one oz (0.6 to 5.5%). Better results are obtained when the calcium is present at levels of about 200 to 1200 mg/oz (wet basis) of product (0.7 to 4.2%). For best results, the total calcium present ranges from about 200 to 300 mg per ounce (0.7 to 1.05%) of finished fruit product. Excessive calcium fortification is to be avoided in part because the finished product can exhibit an undesirable sticky texture somewhat like taffy.

Useful herein as the source of supplemental calcium is calcium phosphate. Calcium phosphate is generally available as a monobasic $(CaH_4(PO_4)_2.H_2O)$, dibasic $(CaHPO_4.2H_2O)$ or tribasic $(Ca_3(PO_4)_2)$ salts. Preferred for use herein is tricalcium phosphate, $Ca_3(PO_4)_2$, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)_2.Ca(OH)_2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while the present calcium phosphate salts are characterized herein as insoluble, of course, some small percentage will dissolve in water depending in part upon the temperature and pH. However, at the concentrations of calcium salt used both in the slurry and the dried fruit composition products herein, the great percentage is in a solid state.

Unfortunately, other calcium salts that might otherwise be thought as useful but cannot be employed for one reason or another include, calcium ascorbate (too expensive), calcium citrate (creates a chalky product and imparts a bad after taste), calcium carbonate (too effervescent and imparts a bad off-flavor), calcium gluconate (too expensive), calcium lactate (too expensive and bad flavor), and calcium sulfate (too strongly flavored).

Additional Ingredients

The present food compositions can optionally contain a variety of additional ingredients suitable for rendering such products more organoleptically acceptable, more nutritious and/or more storage stable. While not essential to the present food compositions, such optional components include fiber materials, high potency sweeteners, colors, coloring agents, vitamins, preservatives, emulsifiers, shortening, dairy products, acidulants, and the like. Of course, highly preferred for use herein are "natural" ingredient additives.

Certain embodiments additionally can comprise a shortening component. The shortening component additionally affects the eating qualities of the present compositions. Inclusion of a shortening increases the shortness of the texture as well as reduces modestly the stickiness of the composition to the consumer's teeth. If present, the shortening can comprise about 0.1 to 8%, preferably 3 to 7% of the composition. Useful herein are shortenings and oils which are conventional for use in food products, especially for confections. Both conventional fatty triglyceridic materials such as oils and fats can be used herein. Preferred for use herein are fats, especially partially hydrogenated oils such as soybean, coconut, cottonseed or fractionated oils, all of which have melting points above room temperature. Employment of such particular fats are preferred due to a reduced tendency of the glyceridic component to grease out of the present fruit compositions.

A variety of edible organic acids can be used to adjust the pH of the present invention as well as to control the taste and tartness of the present products. Especially suitable for use herein are citric acid, tartaric acid, malic acid and mixtures thereof.

METHOD OF PREPARATION

The first essential step is to provide a wet homogeneous blend of the fruit base constituents except for the calcium phosphate. Conventional methods and techniques can be used to practice this step. The blend is an homogeneous mass and not in the form of discrete fruit pieces. Typically, a wet blend is prepared comprising about 40 to 70% solids, preferably about 45 to 65% solids, and for best results about 50 to 60% solids.

In preferred embodiments, the wet blend is subjected to and the methods herein additionally include a preheating step 30 to "set" the gelling properties of the fruit composition. The wet blend can be preheated to 76.6° to 87.7° C. (170° to 190° F.), preferably 79.4° to 85° C. (175° to 185° F.), and for best results about 82.20° C. (180° F.) and held for 5 to 200 seconds prior to the drying step.

The present methods next essentially comprise the step of dehydrating the wet blend from about 45–55% moisture to desired moisture levels. Typically, the finished moisture level ranges from about 9 to 18%, preferably about 10 to 15%. Conventional dehydration techniques can be used to practice the present drying step. Such techniques include, for example, quiescent or forced hot air convection, microwave heating, thin film conduction heating or combinations thereof. Preferred for use herein is thin film conduction heating. Insufficient drying can undesirably result in reduced microbial stability and poor eating qualities. Conversely, over drying undesirably affects the ability to admix the calcium phosphate as well as impairs the finished product eating properties. By virtue of the thermo dehydration step, a thickened fruit gel is created.

Separately, the present methods can comprise the step of forming a slurry by mixing the calcium phosphate with a liquid carrier, preferably a non-aqueous carrier. Non-aqueous carriers are preferred since they do not add back moisture to the dried fruit. Excessive moisture addition can result in product instability. Preferred for use herein for the non-aqueous carrier is an ingredient selected from the group consisting of propylene glycol, glycerine and mixtures thereof. Generally, the slurry comprises the maximum feasible amount of calcium phosphate so as to minimize carrier addition to the dried fruit composition. Good results are obtained when the slurry comprises about 20 to 70% calcium phosphate, preferably 40 to 60% and about 30 to 80% carrier, preferably about 40 to 60% carrier. The preferred carrier is propylene glycol since it forms a thinner, more easily pumpable slurry. For best results, a 50:50 mixture of calcium phosphate and propylene glycol mixture is used as the slurry. In a less preferred variation, the TCP is added as a simple dry material without a carrier. In this embodiment, the TCP is added as a fine powder.

In a less preferred embodiment, the carrier is water. The present calcium phosphate materials are highly alkaline, especially when dispersed in water. In order to avoid altering the pH of the finished fruit products when the calcium phosphate is admixed and avoid an impact on the taste of the products, it is important to "adjust" the aqueous calcium phosphate slurry. The pH is brought to the approximate acidity of the dried fruit composition being fortified by addition of the calcium. It is also important to avoid over acidifying the calcium phosphate. Thus, the pH should be within a few tenths of a pH of the dried fruit composition.

Since the pH of the dried fruit compositions generally will range from about 3.2 to 3.6, good results are generally obtained when the aqueous slurry pH ranges from about 3.2 to 4.6, preferably about 3.2 to 3.6. The preferred pH of the calcium slurry is at the pH of the dried fruit composition or below.

The slurry pH is adjusted to particular values within the above range by addition of an acid or acidulant. Useful herein as the acidulant is adipic, citric acid, fumaric, malic acid, and mixtures thereof. Preferred for use herein as an acidulant is citric acid. When in the preferred form the slurry is free of water, then sufficient amounts of edible organic or mineral acid is added to the wet fruit blend before drying such that the final product is within the desired pH range after addition of the calcium phosphate.

Most importantly, the calcium phosphate has a particle size such that 90% has a particle size of less than 150 microns ("$\mu$m"), that is, a fine powder. Having a calcium phosphate being of sufficiently reduced particle size is to avoiding a "grittiness" organoleptic attribute in the finished dried fruit composition.

A useful technique for ensuring that the calcium phosphate is of the requisite particle size in small scale production is to screen a calcium phosphate starting material. For example, a maximum of 0.5% on a #100 U.S. standard sieve and a minimum of 95% through a #100 U.S. standard sieve is preferred (wet sieve method).

Another technique is to employ a supplemental size reduction step (not shown) after slurry preparation but prior to admixture with the dried fruit composition base. Suitable supplemental size reduction techniques include, for example, passing the slurry through a colloidal mill, passing the slurry through mesh screens/strainers, using a high speed shear impeller in the blender in which the slurry is prepared.

Preferably, the size reduction step results in a slurry wherein the calcium salt has mean particle size of 100 $\mu$m and for best results a mean particle size of less than 50 $\mu$m ("$\leq 50$ $\mu$m").

When an aqueous carrier is employed, the slurry makeup can include a heating substep with vigorous agitation to insure hydration and/or suspension of the insoluble calcium salt.

If desired, supplemental colors and flavors can be admixed into the slurry, preferably after heating to avoid extended exposure of the sensitive flavor materials to elevated temperatures, for color and flavor manipulation of the fruit composition. Since the calcium is white and of fine size, a colorant is preferred for use to mask the white color of the calcium phosphate salt.

In certain embodiments, the dried fruit material is quite bland and/or lacks a strong color, e.g., when the fruit source is supplied by white grape juice solids and/or pear puree. If desired, the dried mass can be partitioned into individual substreams to which a separate color and/or flavor can be added. Thus, it is an advantage of this embodiment that from a single drying apparatus, a plurality or multiplicity of differently colored or flavored products can be prepared from a single uniform wet blend batch or supply.

Thereafter, the slurry can be heated to about 73.9° to 87.8° C. (165° to 190° F.) so that the temperature of the calcium slurry is the same as or below the dried fruit composition upon admixture. Thus, if a heating step is employed, thereafter, the slurry can be cooled to or below the temperature of the dried fruit composition base prior to admixture therewith to reduce thermal shock to the dried fruit composition. The heating substep not only aids in dispersion of the calcium but also ensures that the slurry is aseptic prior to admixture with the dried fruit composition base.

The slurry is then intermixed with the dried fruit blend in sufficient amounts to provide the desired finished calcium contents. Good results are obtained when the weight ratio of slurry to dried fruit blend ranges from about 2.4:100 to 6:100, preferably about 3:100 to about 4:100.

Any suitable technique for uniformly blending the slurry with the dried fruit can be employed. Preferred for use herein for practicing the admixing is to employ in-line static mixers. Statically admixing the slurry and dried fruit is preferred since the calcium addition is accomplished with minimal shear being imparted to the dried fruit composition.

It is important that the calcium addition step be practiced subsequent to the moisture reduction step so as to avoid undesirable precipitation of the calcium from the food material. The calcium precipitation is undesirable in that the calcium tends to form an efflorescent white powder at the surface of the food material. Not only is the efflorescent white chalky powder visually unattractive on the finished compositions, but also the powder tends to form a chalky film on all processing equipment. The chalky film is a highly abrasive material and, being insoluble, is difficult to clean from processing equipment. As a result, the required maintenance time for the processing equipment is undesirably greatly increased. Also, the abrasive material undesirably causes a reduction in the working life of the processing equipment.

The finished fruit composition is characterized by a moisture content of about 9 to 20%, preferably about 12 to 16%. The dried fruit composition has a pH of about 3.2 to 3.6.

Thereafter, the dried calcium fortified sweetened fruit composition can be fabricated into suitably sized and shaped individual pieces to form the present dried fruit snack products herein. In view of the stickiness of the products, such piece forming step can involve the substep of mounting the fruit onto an inedible film or substrate. The substrate typically includes an antistick coating and/or is fabricated from materials that facilitate removal of the dried fruit product therefrom for consumption. Typical shapes include thin films (whether parallelograms or rolls), bars, strings or ropes, and/or bite-sized nuggets. The nuggets can be in irregular form or be shaped to desired configuration, e.g., figurines such as animals, vehicles, toys.

A particularly desirable form is a roll product. The fruit composition is formed into an extended strip of about 10 to 30 mm in width and from 50 to 150 cm in length, about 0.5 to 8 mm in thickness, preferably 1 to 2 mm, mounted upon a slightly larger film substrate (e.g., having a margin of 1 to 2 mm). The product is wound to form a roll having 5 to 15 turns. The roll can be secured in a wound configuration with a peripheral label or by other means.

The individually shaped pieces can then be cooled to approximately room temperature and subsequently packaged in conventional manner. Conveniently, the cooling step can be practiced in a cooling tunnel or other conventional means.

The finished products are soft, pliable, tearable products of both good flavor and eating quality. The products also provide exceptional nutritional properties in terms of sources of calcium. The food products so formed are characterized by being nutritious, wholesome snacks and being fortified with high levels of calcium. The finished products have a water activity ranging from about 0.5 to 0.6 and a moisture content of 9 to 20%, preferably about 12 to 16%.

The present invention is illustrated by the following:

EXAMPLE 1

A fruit product of the present invention is prepared from the following formulation:

| Ingredient | Weight % |
|---|---|
| Strawberries | 36.00 |
| Orange pulp | 14.00 |
| Sucrose | 15.00 |
| Maltodextrin (10 D.E.)[1] | 14.00 |
| Tricalcium phosphate | 12.00 |
| Hydrogenated soybean oil (90° F.)[2] | 2.00 |
| Natural flavoring concentrate | 4.00 |
| Citric acid | 2.00 |
| Lecithin | 1.00 |
| | 100.00% |

[1] A 10 D.E. maltodextrin available from American Maize Products Co. under the trade name of Frodex 10 ™.
[2] A partially hydrogenated soybean oil available from SCM Corp. having a melting point of 90° F.

Two thousand grams of the above ingredients are blended together, except for the tricalcium phosphate, to form a wet blend. The strawberries are first comminuted to a puree and mixed with the orange pulp. Thereafter, the dry ingredients are mixed into the fruit blend. The soybean oil is melted and then mixed into the blend. Finally, the flavorings are added. The wet mixture has a moisture content of about 50%. Separately, a slurry was prepared of 2 kg tricalcium phosphate, 2.5 kg water and sufficient amounts of citric acid (about 80 g) to neutralize to pH 4.8. The tricalcium phosphate is screened through a #100 U.S. standard sieve to ensure a particle size of less than 150 microns.

The wet blend is then heated in a heat exchanger to about 82.2° C. (180° F.) to "set" the pectin constituent. Immediately thereafter, the wet mixture is dried using thin film conductive heating at 110° C. (230° F.) to a moisture content of about 15% to form a par-dried sweetened fruit blend.

The slurry is then admixed with the par-dried do sweetened fruit blend to form a calcium fortified par-dried sweetened fruit composition with the slurry having a temperature of about 10 to 43.3 degrees C. (50 to 110 degrees F.) upon admixture with the dried fruit composition.

Thereafter, the calcium fortified par-dried sweetened fruit composition is spread out onto sheets of wax paper in 1 oz (28 g) portions to form a thin film, and tray dried to a moisture content of about 16% to form a dried calcium fortified sweetened fruit composition. The dried film is then rolled to form a calcium fortified fruit roll article in the form of a roll having a length of about 500 to 1500 mm, a width of about 10 to 30 mm mounted on a paper backing having a width of about 30 to 34 mm, said roll having about 5 to 15 turns.

By virtue of the post drying addition of the calcium, the dryer was clean of any precipitated calcium phosphate on the dryer.

The intermediate moisture, sweetened fruit products of the present invention in the form of fruit leathers exhibit a desirably moist character. The calcium content was about 1500 mg/oz (53 mg/g).

EXAMPLE 2

A fruit product of the present invention is prepared from the following formulation:

| Ingredient | Weight % |
| --- | --- |
| Cherries | 16.00 |
| Pineapple juice concentrate (61° Brix) | 10.00 |
| Pear concentrate (32° Brix) | 10.00 |
| Sucrose | 10.00 |
| Maltodextrin (10 D.E.) | 15.00 |
| Dried corn syrup (25 D.E.) | 15.00 |
| Tricalcium phosphate | 3.00 |
| Wheat flour | 4.00 |
| Fractionated palm oil | 3.00 |
| Natural flavoring concentrate | 3.00 |
| Citric acid | 1.30 |
| Lecithin | 0.20 |
| Water | 9.50 |
| | 100.00% |

Four pounds (1.8 kg) of the above ingredients are blended together, except for the tricalcium phosphate, to form a wet blend and dehydrated in a manner similar to that of Example 1. A slurry similar to that of Example 1 is admixed with the dried sweetened fruit composition to form a dried sweetened fruit composition fortified with calcium.

The intermediate moisture, sweetened fruit products of the present invention also in the form of fruit leathers, similarly exhibit a desirable moist character, and are less chewy. These products are wholesome and contain only "all-natural" ingredients. The calcium content was about 400 mg/oz (14 mg/g).

EXAMPLE 3

A fruit product of the present invention is prepared from the following formulation:

| Ingredient | Weight % |
| --- | --- |
| Orange pulp | 20.00 |
| Grape concentrate (45° Brix) | 20.00 |
| Peach concentrate (32° Brix) | 12.00 |
| Sucrose | 20.00 |
| Corn syrup (63 D.E.) | 10.00 |
| Tricalcium phosphate | 7.00 |
| Wheat flour | 2.00 |
| Hydrogenated coconut oil (92° F.) | 5.00 |
| Natural flavoring concentrate | 2.00 |
| Malic acid | 1.50 |
| Lecithin | 0.50 |
| | 100.00% |

A 20 lb (9.1 kg) batch of the above ingredients, except for the tricalcium phosphate, was blended together to form a wet blend in a manner similar to that of Examples 1 and 2. However, the wet blend was thin film conduction heat dried to a moisture content of 15%.

A slurry similar to that of Example 1 is admixed with the dried sweetened fruit composition to form a dried sweetened fruit composition fortified with calcium.

While still warm, the heated mass was formed into 1 oz (28 g) bars and packaged in conventional packaging. The intermediate moisture, sweetened fruit products of the present invention in the form of fruit bars also exhibit a moist character, a less shiny appearance compared to commercially available products, are less chewy than commercial products and stick less to the teeth. The products of the present invention are wholesome.

Compositions of substantially similar characteristics are realized when in the above formulation the tricalcium phosphate is replaced with equivalent levels of other calcium phosphate salts.

EXAMPLE 4

A fruit product of the present invention is prepared from the following formulation:

| Ingredient | Weight % |
| --- | --- |
| Dried apple powder | 17.00 |
| Apple puree (38° Brix) | 16.00 |
| Sucrose (microse grind) | 15.30 |
| Maltodextrin[1] | 15.00 |
| Corn syrup solids (25 D.E.) | 12.00 |
| Shortening[2] | 6.00 |
| Tricalcium phosphate | 5.00 |
| Glycerine | 3.00 |
| CMC[3] | 3.00 |
| Natural apple flavor | 3.00 |
| Pregel starch[4] | 2.00 |
| Water | 2.00 |
| Citric acid | 0.70 |
| | 100.00% |

[1]Frodex 10 ™ available from American Maize Products Co.
[2]A partially hydrogenated soybean oil available from SCM Corp.
[3]Sodium carboxymethyl cellulose type 7H3SXF available from Hercules Powder Co.
[4]Instant Clearjel ™ available from National Starch & Chemical Corp.

A 15 lb (6.82 kg) batch of fruit product is prepared by first preparing a pre-blend of dry ingredients and the wet ingredients, except for the tricalcium phosphate. The wet ingredients are heated to about 37.7° C. (100° F.) or until the shortening is melted and dispersed therein. The wet ingredients are slowly added to the dry ingredients with strong mixing equipment.

A slurry similar to that of Example 1 is admixed with the dried sweetened fruit composition to form a dried sweetened fruit composition fortified with calcium. The mixture is slabbed to a sheet of 0.5 in. (1 cm) thickness, allowed to cool, and cut into pieces.

What is claimed is:

1. A food composition fortified with calcium, comprising:
   A. about 5 to 65% by weight of the composition of comminuted edible plant solids;
   B. about 0.1 to 85% by weight of the composition of added carbohydrates;
   C. sufficient amounts of calcium phosphate to provide a total calcium content of about 180 to 1500 mg per one ounce of the composition, said calcium phosphate having a particle size distribution such that at least 90% have a particle size of less than 150 microns; and
   D. about 9 to 20% by weight of the composition of moisture.

2. The food composition of claim 1 wherein
   A. the plant solids comprise from about 9 to 30% by weight of the composition;
   B. wherein the sweeteners comprise about 20 to 70% by weight of the composition; and C. wherein the total calcium content ranges from about 200 to 1200 mg per 28.4 g by weight of the composition.

3. The food composition of claim 2 wherein the edible plant solids include fruit solids and wherein the moisture content is about 12 to 16%.

4. The food composition of claim 3 wherein the calcium phosphate is supplied by a material selected from the group consisting of monobasic, dibasic or tribasic calcium phosphate salts, their hydrates and mixtures thereof.

5. The food composition of claim 4 wherein the calcium is supplied by tricalcium phosphate.

6. The food composition of claim 5 wherein the total calcium content ranges from about 200 to 300 mg per 28.4 g and wherein the mean particle size of the tricalcium phosphate is less than 100 µm.

7. The food composition of claim 6 wherein the edible plant solids are selected from the group consisting of strawberries, cherries, blueberries, raspberries, grapes, oranges and mixtures thereof and wherein the sweeteners are selected from the group consisting of sucrose, corn syrup solids and fructose.

8. The food composition of claim 7 wherein the pH is about 3.2 to 3.6.

9. The food composition of claim 8 in the form of an individual piece having an exterior configuration in the form of a figurine.

10. The food composition of claim 8 substantially free of a topical white film of calcium phosphate.

11. The food composition of claim 8 in the form of an individual piece having a thickness of 1 to 8 mm mounted on an inedible substrate.

12. The food composition of claim 11 substantially free of a topical white film of calcium phosphate.

13. The food composition of claim 12 in the form of a roll.

14. The food composition of claim 13 in the form of a roll having a length of about 500 to 1500 mm, a width of about 10 to 30 mm mounted on a paper backing having a width of about 30 to 34 mm, said roll having about 5 to 15 turns.

15. A method for fabricating a sweetened intermediate moisture food product fortified with calcium comprising the steps in sequence of:

A. providing a wet base comprising about 5 to 65% by weight (dry basis) comminuted edible plant materials that contribute solids, about 20 to 70% by weight (dry basis) nutritive carbohydrate sweeteners and about 45 to 55% moisture;

B. dehydrating the wet base to form a dried sweetened composition having a moisture content of about 9 to 20%; and C. thereafter, adding sufficient amounts of calcium phosphate to the dried sweetened composition to provide a dried sweetened calcium fortified composition having a total calcium content of about 180 to 1500 mg of calcium per 28.4 g of product (0.6 to 5.5% by weight calcium).

16. The method of claim 15 wherein step C includes the substeps of forming a slurry comprising:

about 30 to 40% calcium phosphate;

about 60 to 70% water;

sufficient amounts of acid to impart the slurry with a pH of about 3.2 to 4.6; and admixing the slurry to the dried sweetened composition.

17. The method of claim 15 wherein step C includes the substep of:

forming a slurry comprising about 40 to 60% calcium phosphate and the balance an ingredient selected from the group consisting of propylene glycol, glycerine and mixtures thereof, and admixing the slurry to the dried sweetened composition.

18. The method of claim 17 wherein in step B, the wet base is dried at a temperature of about 65.5° to 110° C. (150° to 230° F.) and wherein the slurry has a temperature of about 10° to 43.3° C. (50° to 110° F.) upon admixture with the dried fruit composition.

19. The method of claim 18 wherein the calcium phosphate is tricalcium phosphate having a particle size of less than 150 microns.

20. The method of claim 19 additionally comprising the step of prior to drying, heating the wet blend to a temperature of 76.6° to 87.7° C. (170° to 190° F.) for about 5–200 seconds.

21. The method of claim 19 wherein the admixture is practiced by in-line statically mixing the slurry with the dried sweetened composition.

22. The method of claim 18 additionally comprising the step of:

D. forming the dried sweetened calcium fortified composition into shaped and sized pieces.

23. The method of claim 22 wherein the pieces have a thickness of about 0.5 to 8 mm.

24. The method of claim 22 additionally comprising the step of:

E. mounting the shaped and sized fruit pieces onto an inedible film or paper substrate.

25. The method of claim 24 additionally comprising the step of rolling the pieces to form a roll having 5 to 15 turns.

26. The method of claim 24 additionally comprising the steps of partitioning the dried sweetened calcium fortified composition into a plurality of substreams, and admixing a flavor or color into at least one substream.

27. The product prepared by the method of claim 26.

28. The product prepared by the method of claim 15.

29. In a sweetened dried fruit product comprising fruit solids, sugars and about 9 to 20% moisture, the improvement comprising:

fortifying the product with a calcium phosphate to a total calcium content of about 180 to 1500 mg/oz.

30. The product of claim 29 wherein the product is substantially free of a topical calcium phosphate film.

31. The product of claim 30 wherein the calcium phosphate is tricalcium phosphate.

32. The product of claim 31 in the form of a roll.

* * * * *